(12) United States Patent
Fredette et al.

(10) Patent No.: US 7,275,568 B2
(45) Date of Patent: Oct. 2, 2007

(54) LIQUID RECLAMATION APPARATUS

(76) Inventors: Thomas Fredette, 10 Nidzyn Ave., Speonk, NY (US) 11972; David Fredette, 81 Atlantic St., Apt. 13, Stamford, CT (US) 06901

(*) Notice: Subject to any disclaimer, the term of this patent is extended or adjusted under 35 U.S.C. 154(b) by 50 days.

(21) Appl. No.: 11/222,420

(22) Filed: Sep. 8, 2005

(65) Prior Publication Data

US 2007/0051424 A1 Mar. 8, 2007

(51) Int. Cl.
*B65B 1/04* (2006.01)

(52) U.S. Cl. .............................. 141/87; 141/86; 141/98; 141/114

(58) Field of Classification Search ............ 141/86–88, 141/98, 114, 314–316, 363–366; 184/106
See application file for complete search history.

(56) References Cited

U.S. PATENT DOCUMENTS

| | | | |
|---|---|---|---|
| 4,098,398 A | 7/1978 | Meyers | |
| 4,403,692 A | 9/1983 | Pollacco | |
| 4,442,936 A | 4/1984 | Densham | |
| 4,524,866 A | 6/1985 | Pollacco | |
| 4,533,042 A | 8/1985 | Pollacco | |
| 4,673,081 A | 6/1987 | Habig et al. | |
| 4,784,260 A | 11/1988 | Holben | |
| 4,815,591 A | 3/1989 | Tivy | |
| 4,823,947 A * | 4/1989 | Maynard, Jr. ............... | 206/223 |
| 4,856,652 A | 8/1989 | Bowland | |
| 5,060,849 A | 10/1991 | King | |
| 5,082,035 A * | 1/1992 | Maxwell ..................... | 141/98 |
| 5,092,457 A | 3/1992 | Islava et al. | |
| 5,305,910 A | 4/1994 | Pollacco | |
| 5,375,703 A | 12/1994 | Deuber | |
| 5,454,960 A * | 10/1995 | Newsom ..................... | 210/805 |
| 5,921,292 A | 7/1999 | Fouts | |
| 5,967,200 A * | 10/1999 | Hall ............................ | 141/86 |
| 5,975,156 A | 11/1999 | Senour | |
| 6,085,806 A | 7/2000 | Davis et al. | |
| 6,742,551 B2 * | 6/2004 | Davis et al. ................. | 141/98 |
| 6,881,345 B2 | 4/2005 | MacQuoid | |
| 7,137,419 B1 * | 11/2006 | Reeves ....................... | 141/340 |
| 2006/0090811 A1 * | 5/2006 | Folk ............................ | 141/86 |

* cited by examiner

*Primary Examiner*—Timothy L. Maust
(74) *Attorney, Agent, or Firm*—Carter, DeLuca, Farrell & Schmidt LLP

(57) ABSTRACT

A liquid reclamation apparatus for use in changing automobile oil includes a container, a portable receptacle within the container and dimensioned to hold a volume of oil sufficient to perform an oil change and a cover releasably secured to the container.

8 Claims, 11 Drawing Sheets

LIQUID RECLAMATION APPARATUS

BACKGROUND

1. Technical Field

The present disclosure relates to an apparatus for the reclamation of liquids and, more particularly, relates to a system and apparatus for the collection and transportation of liquids such as engine oil and other similar fluids.

2. Background of the Related Art

In order to ensure the long life of an automobile, it is of critical importance that the engine oil be changed regularly. Typically, the automobile manufacturer recommends changing the oil every 3,000 to 5,000 miles. Many owners utilize various service centers and pay mechanics to change the oil for them. However, in an effort to conserve time and money many automobile owners change their own oil.

There are significant drawbacks, however, to changing your own oil. Most importantly, there is no convenient way of disposing the waste oil. Moreover, once the waste oil has been contained, it must be transported to a recycling center in order to comply with environmental laws. For the average automobile owner, this is no easy task. Dealing with engine oil can be very messy. Most automobile owners do not have the proper containers for the storage and subsequent transport of the waste oil. Thus, there remains a need for a more environmentally and user friendly automobile oil waste receptacle.

SUMMARY

Accordingly, the present disclosure is directed to improvement in current oil changing practices. In one preferred embodiment, an oil reclamation system is provided. The oil reclamation system includes at least one reclamation apparatus. The reclamation apparatus includes a container, a portable receptacle configured to fit within the container and dimensioned to hold a volume of oil sufficient to perform an oil change on a vehicle and having a dispenser attached thereto, and a cover releasably secured to the container. The portable receptacle preferably includes a flexible bag.

Preferably, the oil reclamation system includes first and second reclamation apparatii connected to each other in side by side relation for transport and/or storage. The first reclamation apparatus includes at least one attachment rail adjacent an outer wall portion of said container and the second reclamation apparatus includes at least one attachment groove adjacent an outer wall portion of the container for receiving the at least one attachment rail to connect the containers of the first and second oil reclamation apparatii. The first reclamation apparatus may further include at least one attachment groove adjacent an outer wall portion of the container and the second reclamation apparatus includes at least one attachment rail adjacent an outer wall portion of the container.

The first and second reclamation apparatii may also be arranged and stored in vertical stacked relation. For example, the container of the first reclamation apparatii includes a recessed portion adapted to accommodate at least the cover of the second reclamation apparatii when in the vertical stacked relation of the first and second reclamation apparatii.

In another embodiment, an oil reclamation system includes a container being expandable from a contracted transport condition to an expanded in use condition. The container defines an internal chamber when in the expanded condition for accommodating a volume of oil. At least one handle is mounted to the container and is adapted to facilitate maneuvering of the container from the contracted position to the expanded position. A cover is releasably mounted to the container to enclose the internal chamber. The handle may be contained within the outer boundary of the container. A valve may be in fluid communication with the internal chamber of the container. The valve permits release of gaseous media from the internal chamber. The container may define a hinge in an outer wall portion thereof, whereby wall portions adjacent the hinge are adapted to pivot upon movement of the container to the expanded condition thereof.

In another preferred embodiment, a liquid reclamation apparatus includes a container, a portable receptacle receivable within the container and dimensioned to accommodate a volume of oil sufficient to perform an oil change on a vehicle and a cover releasably mounted to the container. The cover is attached to the portable receptacle whereby removal of the cover from the container causes corresponding removal of the portable receptacle. The cover is releasably mounted to the container via a threaded connection and may define a dispenser port. The portable receptacle may include an impermeable bag.

BRIEF DESCRIPTION OF THE DRAWINGS

Preferred embodiments of the present disclosure are described hereinbelow with references to the drawings, wherein.

DETAIL DESCRIPTION OF THE PREFERRED EMBODIMENT(S)

The liquid reclamation system and apparatus of the present disclosure provides the vehicle owner with a viable option when changing the oil in his/her car. Within the empty container of the apparatus, there may be a receptacle of new oil. This receptacle is removed from the container and the used oil may be drained into the container. Once the used oil is drained from the automobile and into the container, the new oil within the receptacle is emptied into the car. Then, the empty receptacle may be placed inside of the container with the used oil and the apparatus is sealed. The container may be configured to include a recessed bottom allowing for one container to be stacked on top of another. Furthermore, the containers may contain connective slots along the side, so that one container may be secured to an adjacent container. This horizontal and vertical connectivity facilitates storage and transport of a large number of apparatii 100, e.g., on a grate.

Figure 1:
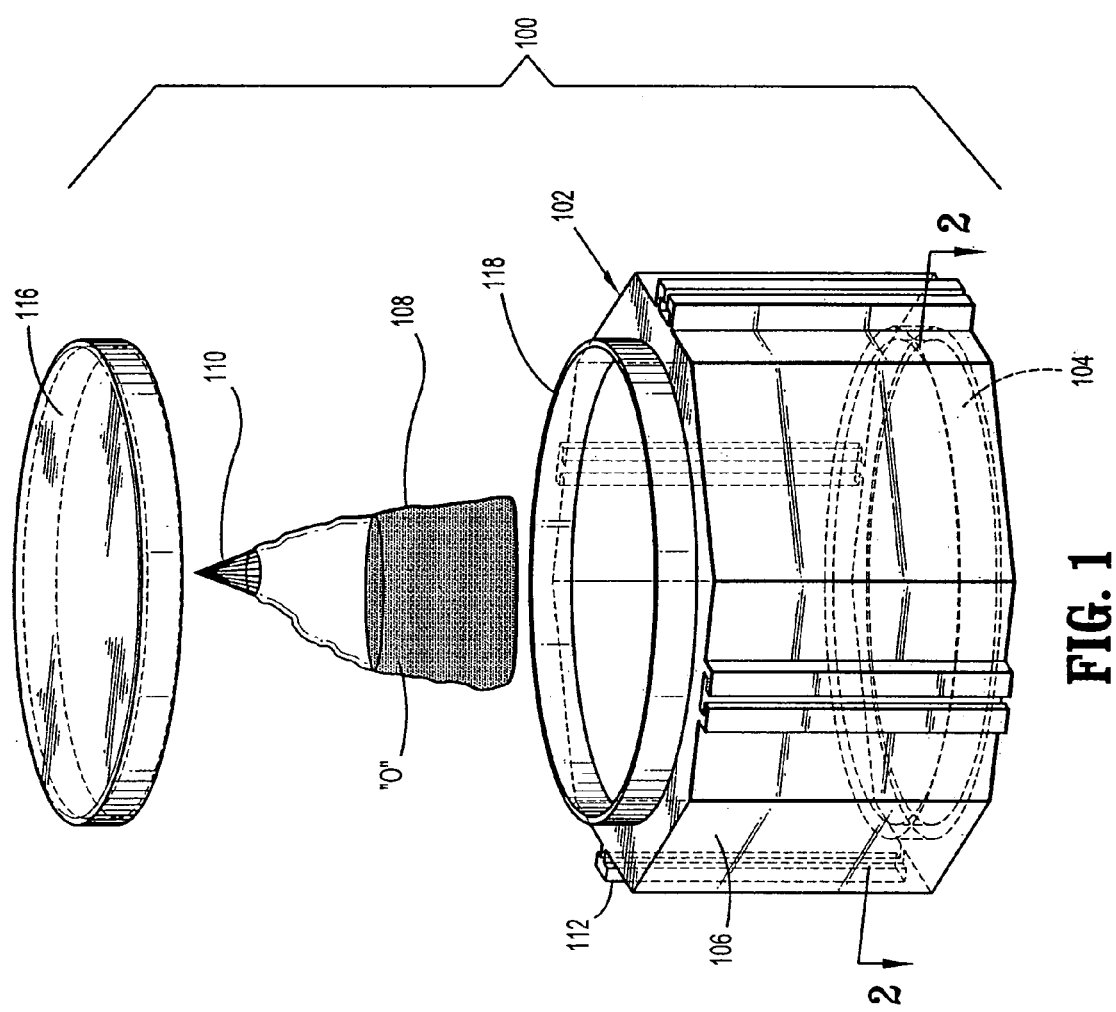
FIG. 1 is a perspective view of the oil reclamation apparatus of the present disclosure.
Figure 2:
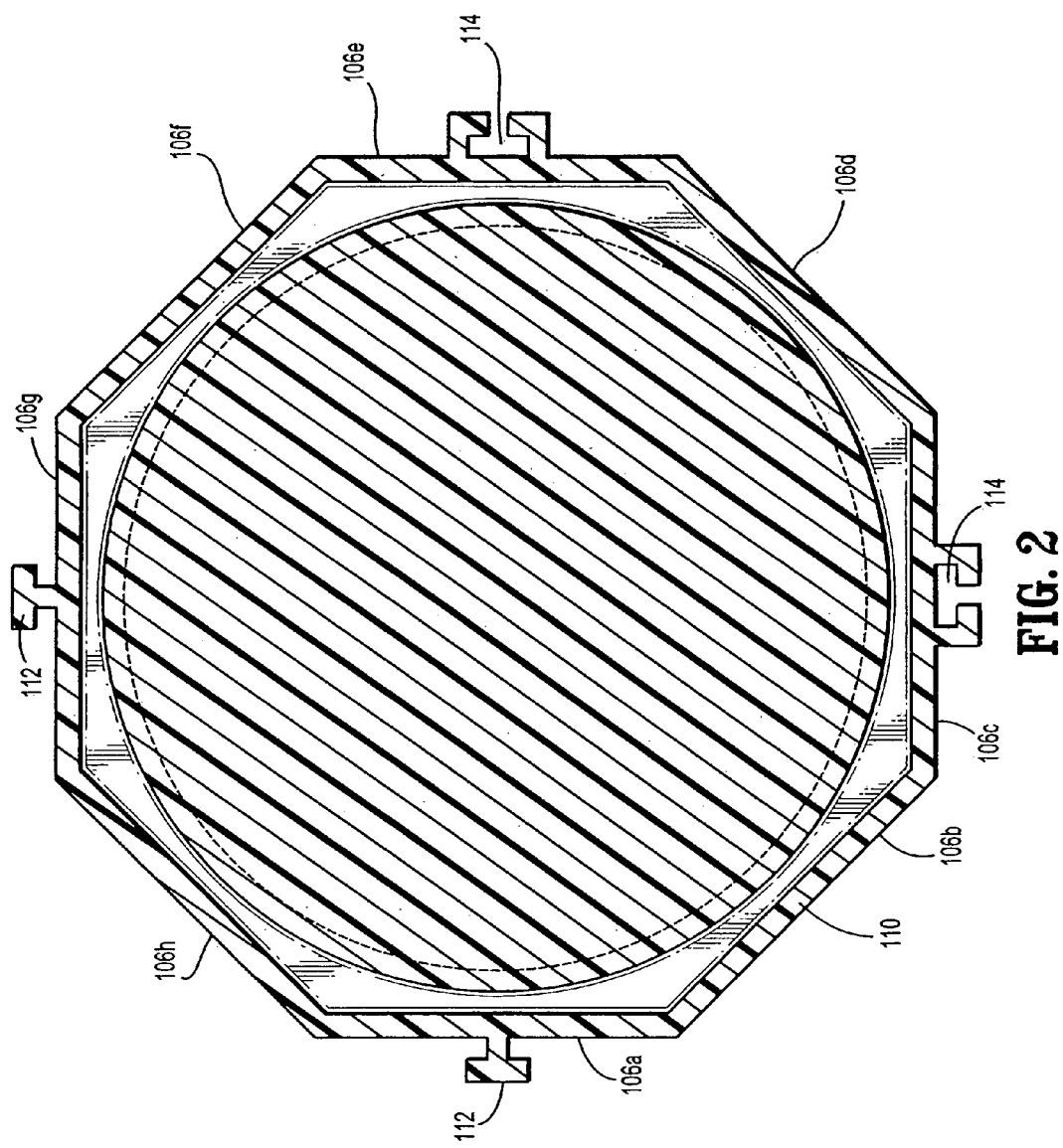
FIG. 2 is a cross-sectional view of the oil reclamation apparatus taken along the lines 2-2 of FIG. 1.
Figure 3:
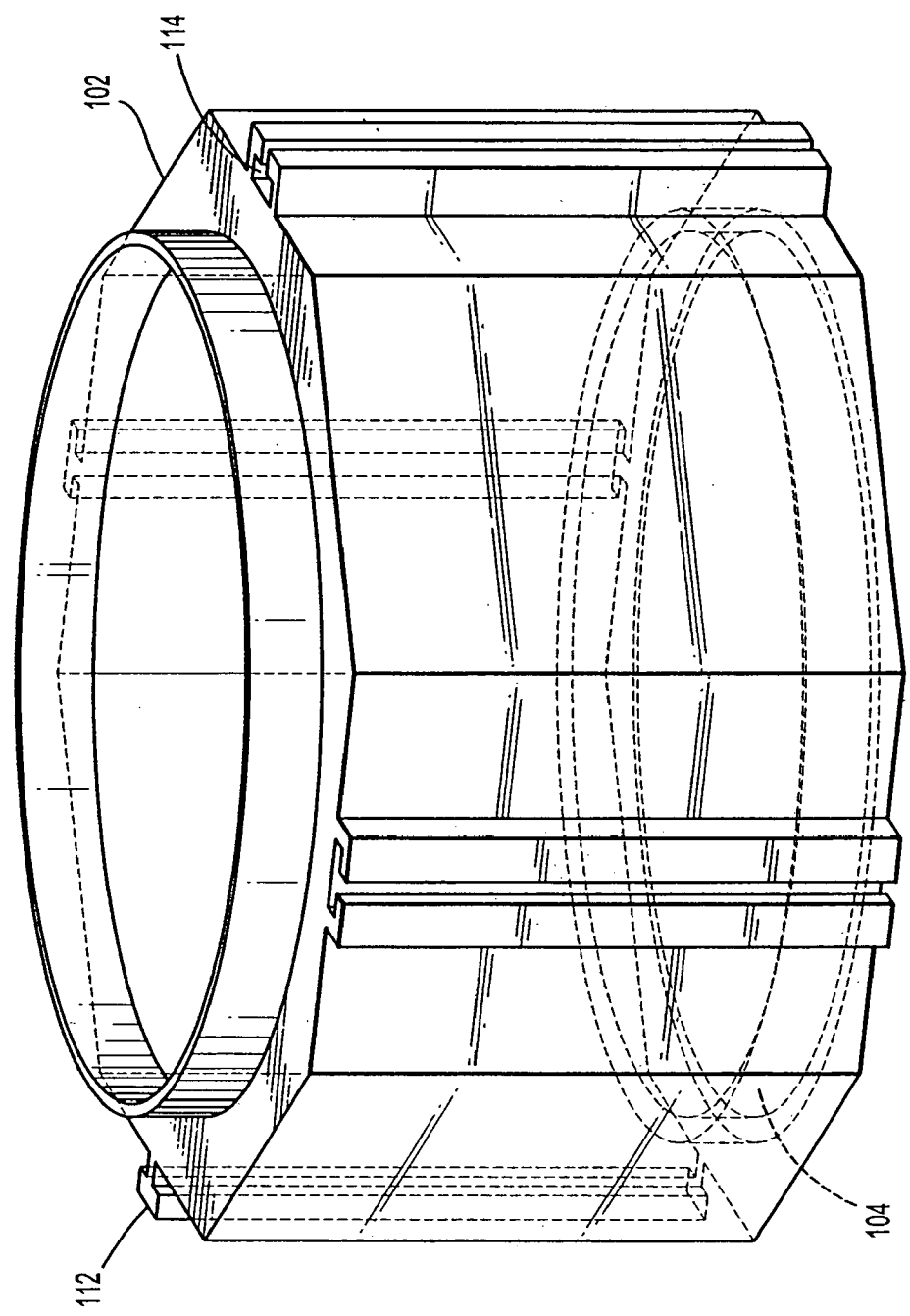
FIG. 3 is an enlarged perspective view of the container of the oil reclamation apparatus.

Referring now to the drawings, in which like reference numerals identify identical or substantially similar parts throughout the several views, FIGS. 1-3 illustrate the oil reclamation apparatus 100 of the present disclosure. Oil reclamation apparatus 100 includes container 102 dimensioned to receive and transport a liquid, e.g., oil. Container 102 has recessed bottom 104 which permits stacking of a plurality of apparatii 100 as will be discussed. Container 102 may define any shape in cross-section including circular, elliptical or polygonal. In one preferred embodiment, container 102 defines an octagonal shape having a plurality of interconnecting sides 106a-h. Other dimensions are also envisioned. Container 102 may be constructed of a variety of different materials including but not limited to polymeric and metallic materials.

Each container 102 may house portable receptacle 108 which is configured to fit within container 102 and is dimensioned to hold a liquid. Receptacle 108 includes a dispenser 110 to ease fluid transfer. Receptacle 108 may be any device capable of storing and dispensing fluid. In one embodiment, receptacle 108 is a polymeric bag filled with fluid oil "o" (see FIG. 1). Preferably, receptacle 108 is capable of accommodating a volume of liquid, e.g., five or six quarts, sufficient to perform an oil change on a vehicle. Other containers, cans, boxes, etc. are also envisioned. Dispenser 110 may be a spout or the like adapted for dispensing of oil. Dispenser 110 could be funnel or cone-shaped defining an internal lumen to permit the oil to be dispensed. Dispenser 110 may incorporate a one way valve. Other spouts, caps, nozzles etc. are also envisioned.

Figure 4:
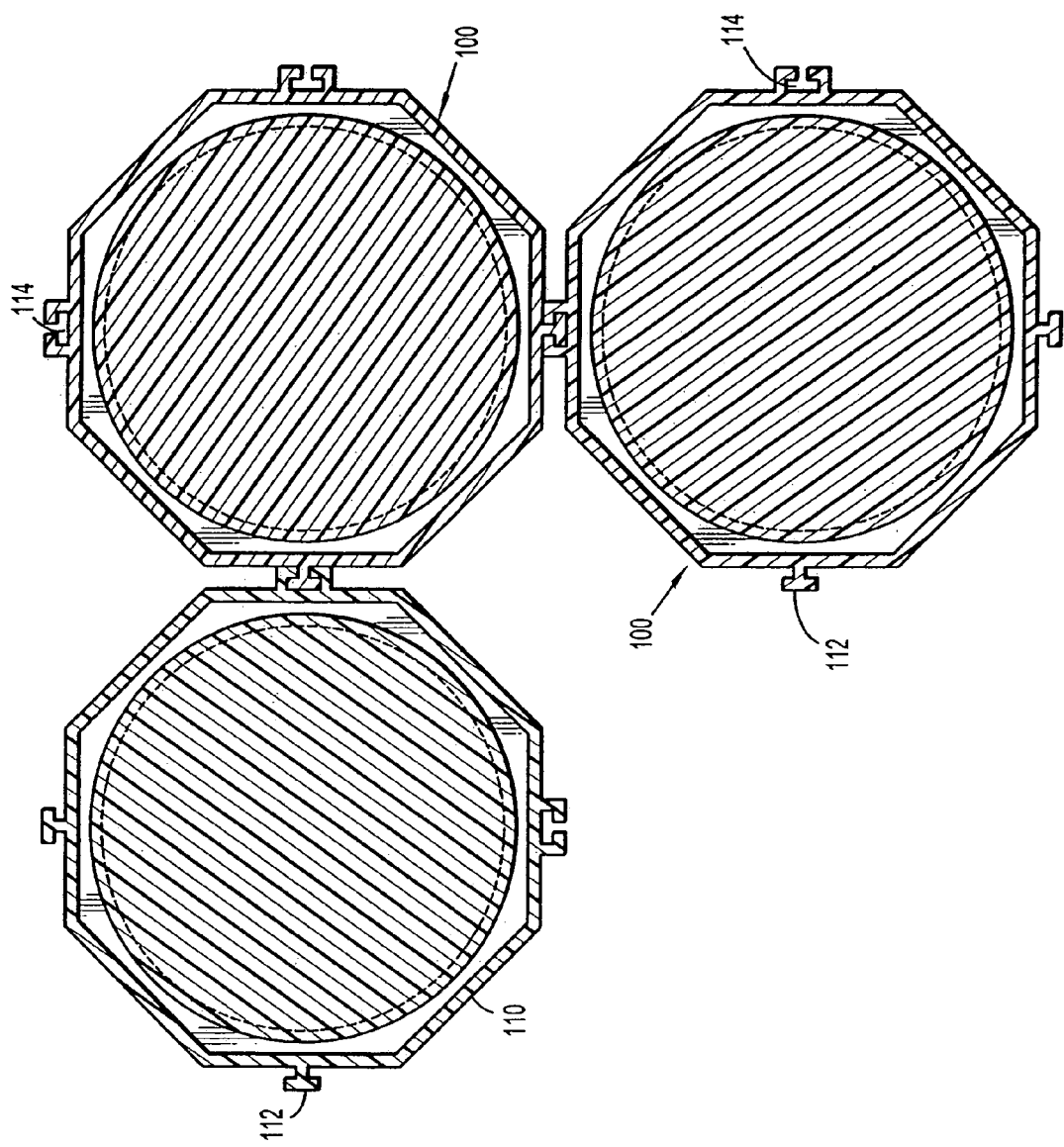
FIG. 4 is a view illustrating side by side assembly of a plurality of oil reclamation apparatii.

Container 102 may further include attachment rails 112 on at least two sides of the container 102 and attachment grooves 114 on another two sides. Attachment rails 112 of one container 102 are dimensioned to be received within attachment grooves 114 of an adjacent container 102 to facilitate storage and/or transport of a number of apparatii 100 in side by side relation. FIG. 4 illustrates several apparatii 100 stored in side by side relation with attachment rails 112 of one apparatii 100 being received within attachment grooves 114 of a second adjacent apparatii 100. Attachment rails 112 and grooves 114 may have a variety of configurations. In one preferred embodiment, the cross-sectional dimension of attachments rail 110 is generally t-shaped for reception within a correspondingly dimensioned t-shaped groove 112. Other shapes are also envisioned.

Figure 5:
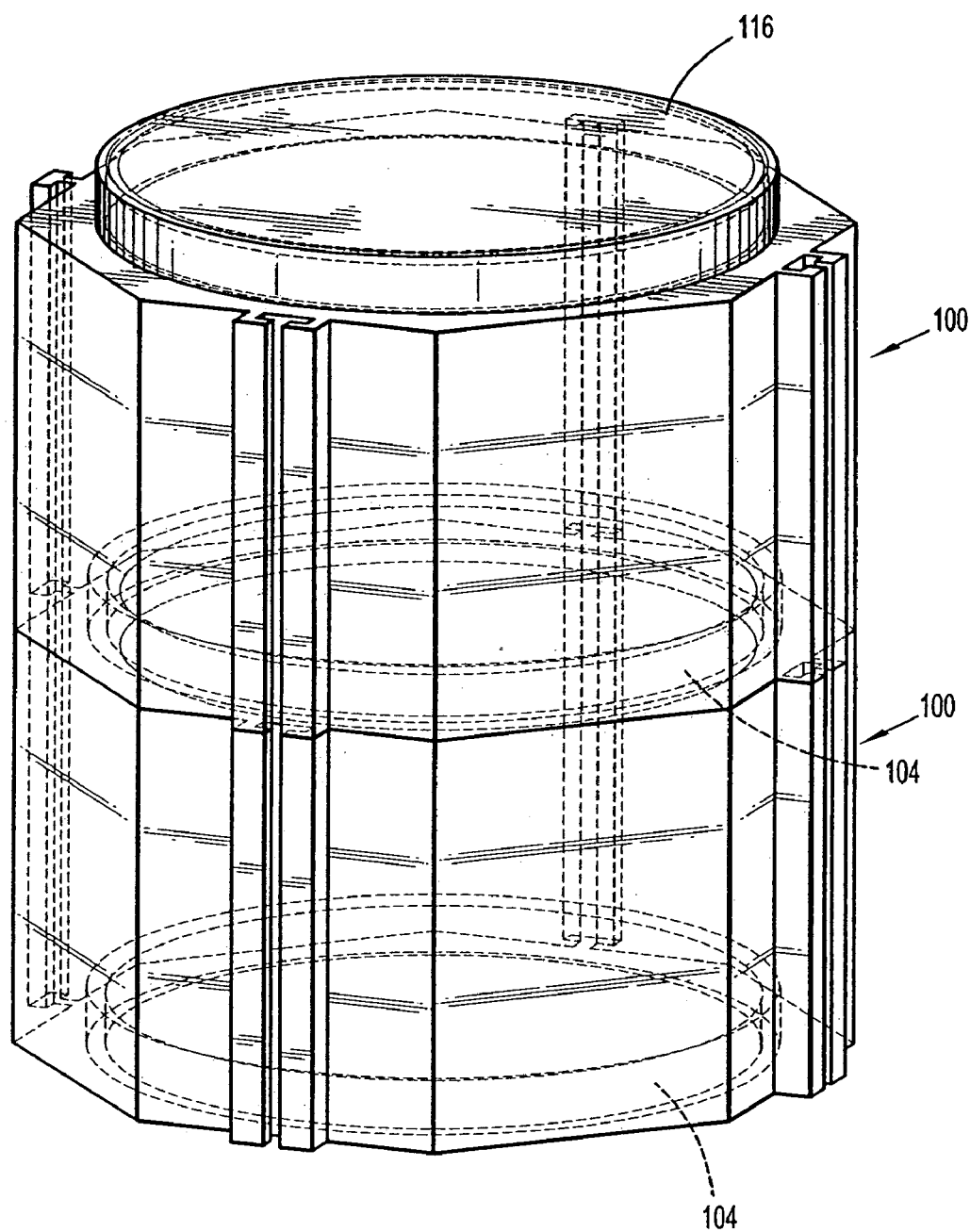
FIG. 5 is a perspective view illustrating a stacked relation of two oil reclamation apparatii.

Container 102 may further include cover 116. Cover 116 may be detachably secured about rim 118 of container 102 by any means including threaded means, bayonet coupling, interference fit, etc. Cover 116 and rim 118 are dimensioned to be accommodated within recessed portion 104 of an adjacent stacked container 102 so as to interlock via a friction or interference fit with the recessed bottom 104 of container 102 thereby facilitating stacking of a large number of apparatii 100. FIG. 5 illustrates a stacked relation of two apparatii 100.

The side by side connectability of adjacent apparatii 100 as provided by attachment rails and grooves 110,112 and the stacking capability as provided by the reception of cover 114 and rim 116 within recess 104 substantially improves storage and transport of a large number of apparatii 100.

Moreover, the side by side and vertical connecting features permits for a large number of apparatii to be stored and/or transported on, e.g., a grid. The grid may be lifted in unison by a forklift or other machine and loaded onto a transport vehicle as a single unit.

The operation of the liquid reclamation apparatus 100 of the present disclosure will now be discussed in the context of automobile engine oil replacement. Cover 116 is removed from container 102 and portable receptacle 106 is removed. Container 102 is placed underneath the automobile and the waste oil is drained into container 102. Portable receptacle 106 containing a fresh supply of oil is dispensed through dispenser 110 into the automobile, replacing the oil which was just drained. Portable receptacle 106, once emptied, may then be placed inside of container 102 with the waste oil. Cover 116 may then be secured to container 102 locking the waste oil and used portable receptacle 106 therein. Once secured, container 102 may be transported to a recycling facility for proper disposal.

Figure 6:
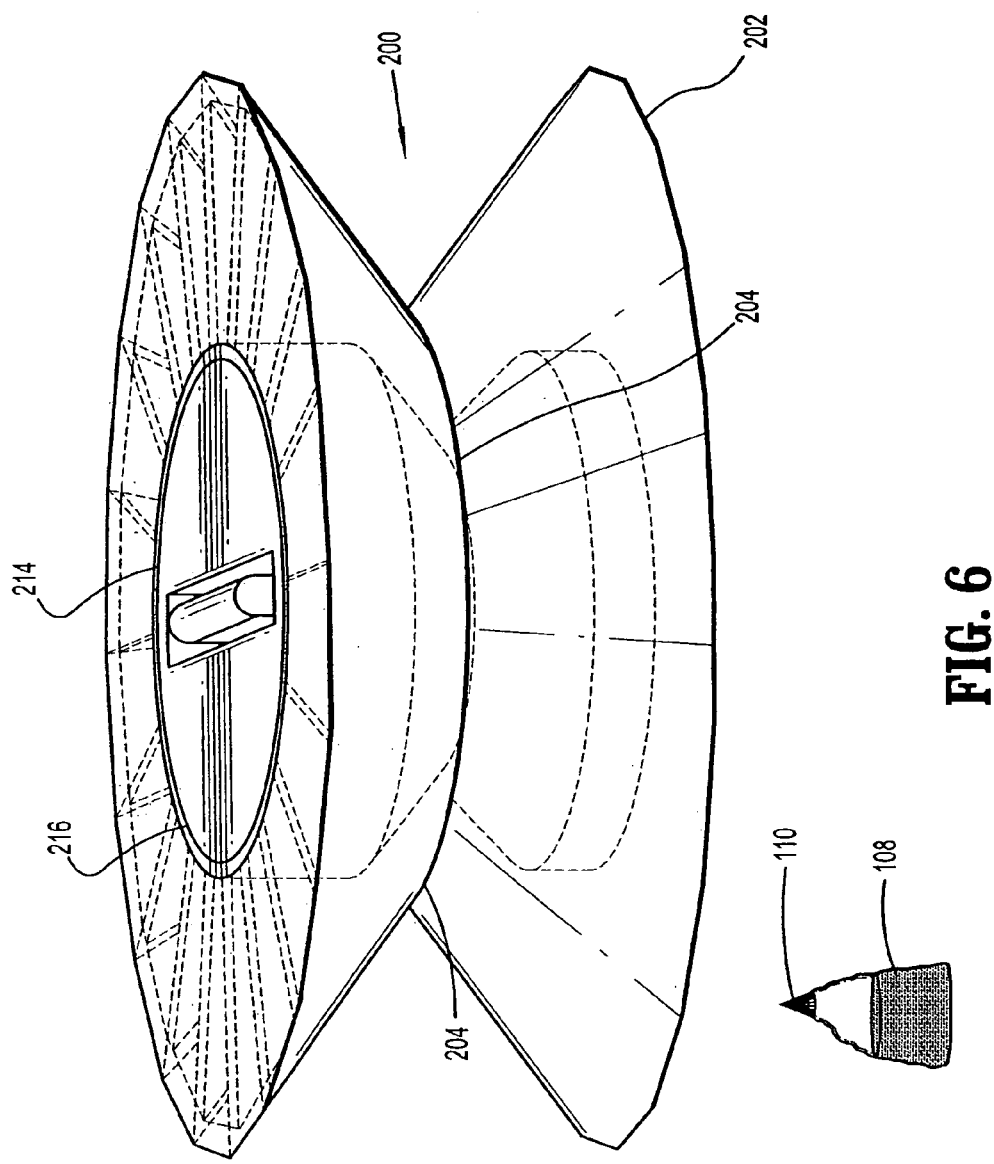
FIG. 6 is a perspective view of an alternate embodiment of the oil reclamation apparatus of the present disclosure in a contracted transit condition.
Figure 7:
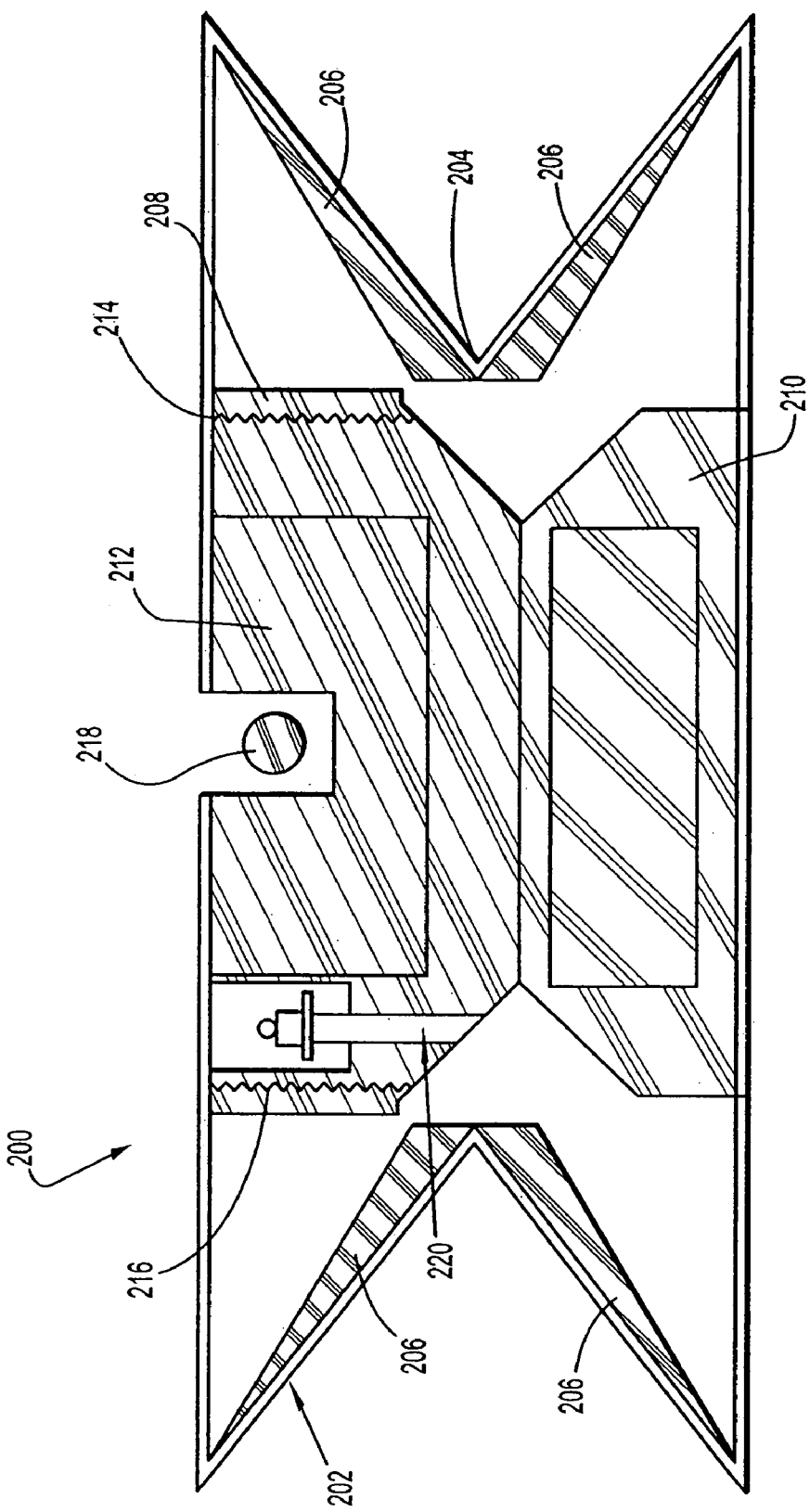
FIG. 7 is a cross-sectional view of the oil reclamation apparatus of FIG. 6 in the contracted condition.
Figure 8:
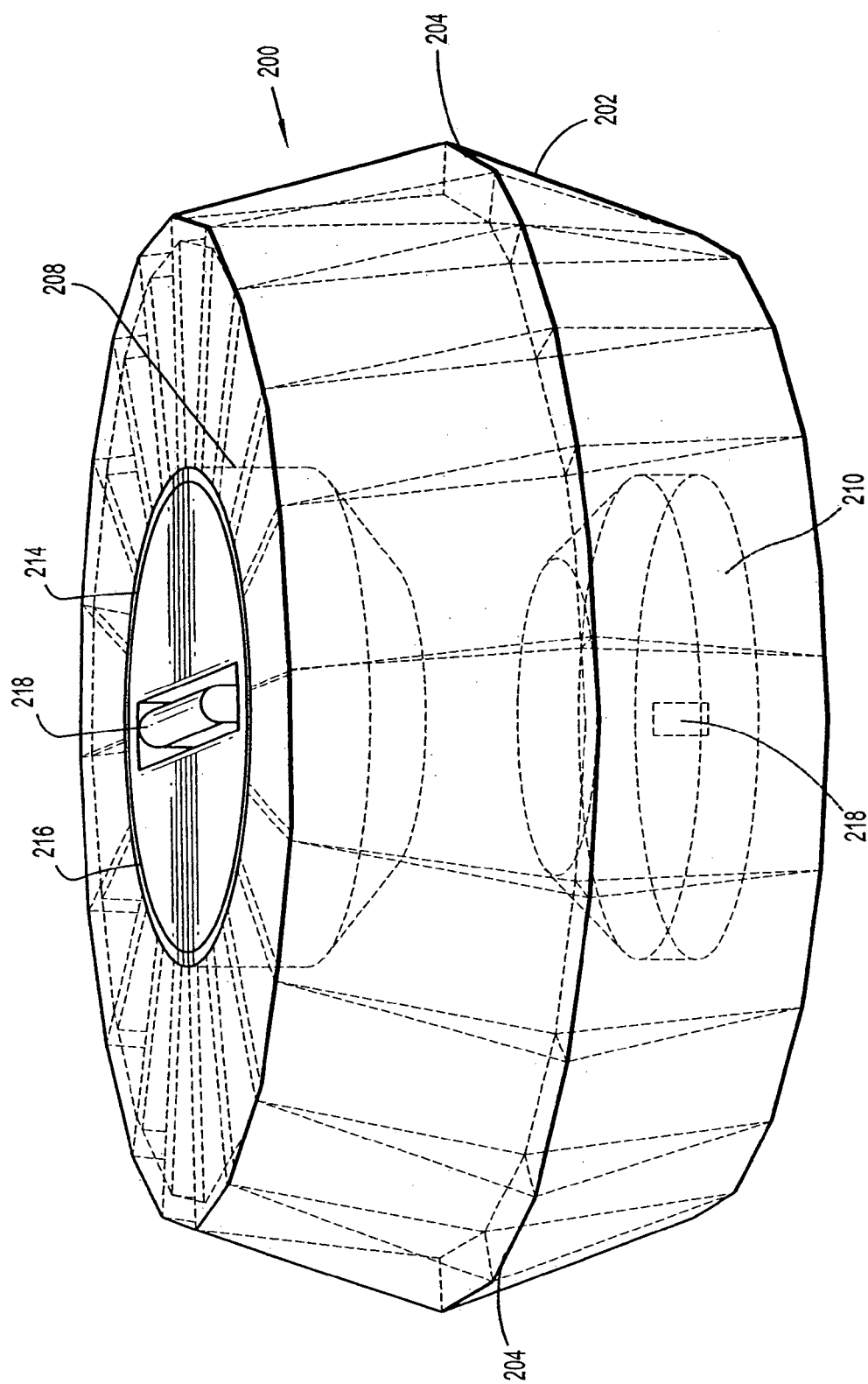
FIG. 8 is a perspective view of the oil reclamation apparatus of FIG. 6 in an expanded in use position.

Referring now to FIGS. 6-8, another embodiment of the present disclosure will be discussed. Liquid reclamation apparatus 200 includes container 202. Container 202 is preferably fabricated from a flexible membrane such as polypropylene, polyethylene, etc. . . . which permits the container 202 to expand from the collapsed transit condition shown in FIGS. 6-7 to the expanded in use condition shown in FIG. 8. In one preferred embodiment, container 202 defines medial hinge line 204 about which the membrane portions 206 adjacent and intersecting the hinge line 204 pivot to assume the expanded condition of FIG. 8. Preferably, the thickness of membrane portions 206 of container 202 increases or is greatest adjacent hinge line 204 to ensure that the container 202 remains in the expanded in use condition once it is deployed. It is also envisioned that the membrane may incorporate reinforcing structure such as strips of rigid polymeric material adjacent hinge line 204 to increase stability upon expansion of container 102. One skilled in the art may readily determine the dimensioning and material selection required to accomplish this objective.

Container 202 further includes upper and lower housing components 208, 210 disposed within the internal chamber of container 202. Upper and lower housing components 208, 210 may be fabricated from a polymeric material or the like and are preferably embedded, integrally formed or attached to container 202 by conventional means. Upper housing component 208 incorporates cap or cover 212 which is releasably mounted to the housing component 208. In one preferred embodiment, cap 212 and upper housing component 208 incorporate cooperating threads 214, 216 to establish the releasable attachment of the cap 212 to the housing component 208. Other connection arrangements are also envisioned including bayonet coupling, interference fit, etc. Cap 212 incorporates handle 218 which facilitates expansion of container 202 to the expanded condition by providing a means upon which the operator may grasp and expand the container 202. Handle 218 is preferably recessed within cap 312 so as to not extend beyond the outer boundary of container 202. It is envisioned that lower housing component 210 may incorporate a handle. Cap 212 further incorporates check valve 220 in fluid communication with the internal chamber of container 202. Check valve 220 permits the inflow of air into the container 202 so as to maintain the expanded condition of the container 202 while preventing the exit of air from the container 202. Check valve 220 may also be adapted to prevent the flow of oil from container 202 subsequent to performing the oil change.

Preferably, container 202 is shipped in the compressed condition of FIGS. 6-7 prior to use. As appreciated, multiple apparatii 200 may be packaged in its compressed condition into a single package, e.g., in stacked relation. Container 202 may or may not be provided with oil receptacle having a supply of oil sufficient to perform an oil change. In use by an operator, container 202 is expanded from the transit condition of FIGS. 6-7 to the expanded condition of FIG. 8. Cap 212 is removed and the used oil is drained from the vehicle into container 202. Upon completion, cap 212 is placed back onto container 202 and secured thereon through the threaded means.

Figure 9:
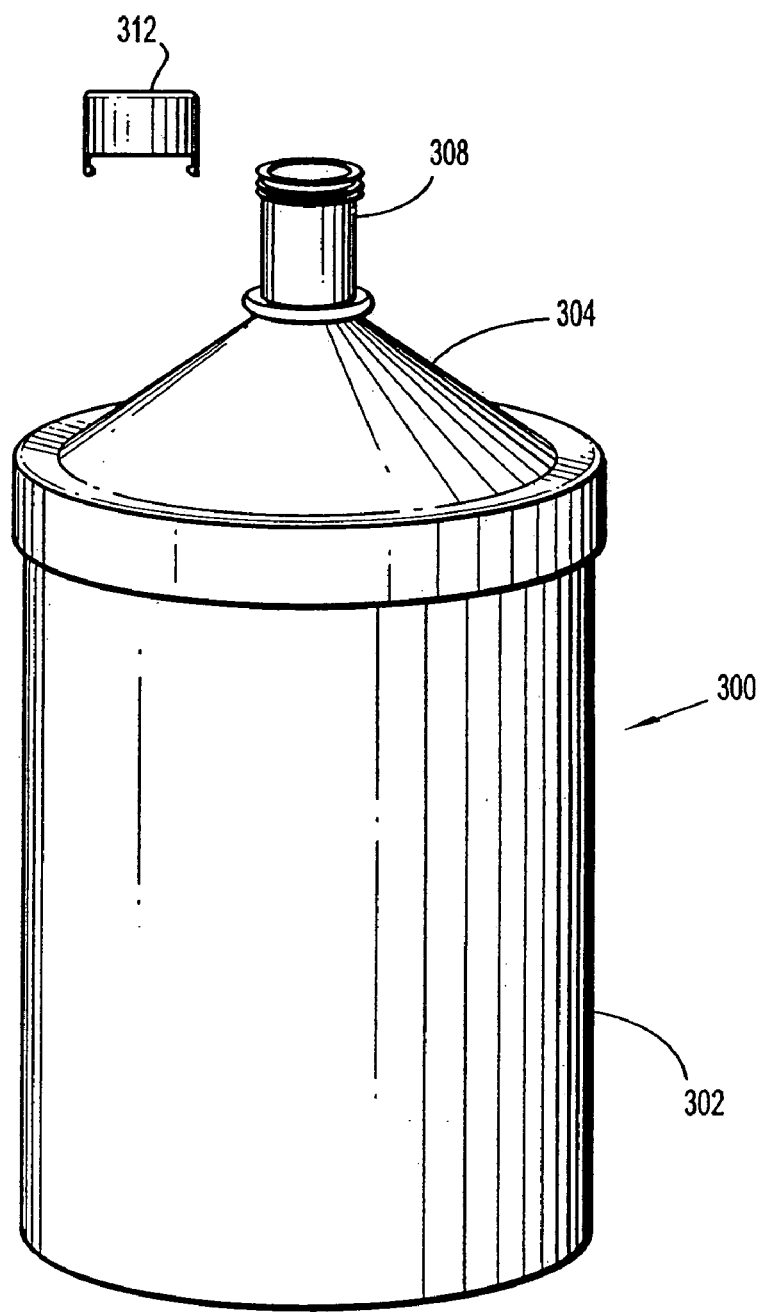
FIG. 9 is a perspective view of an alternate embodiment of the liquid reclamation apparatus of the present disclosure.
Figure 10:
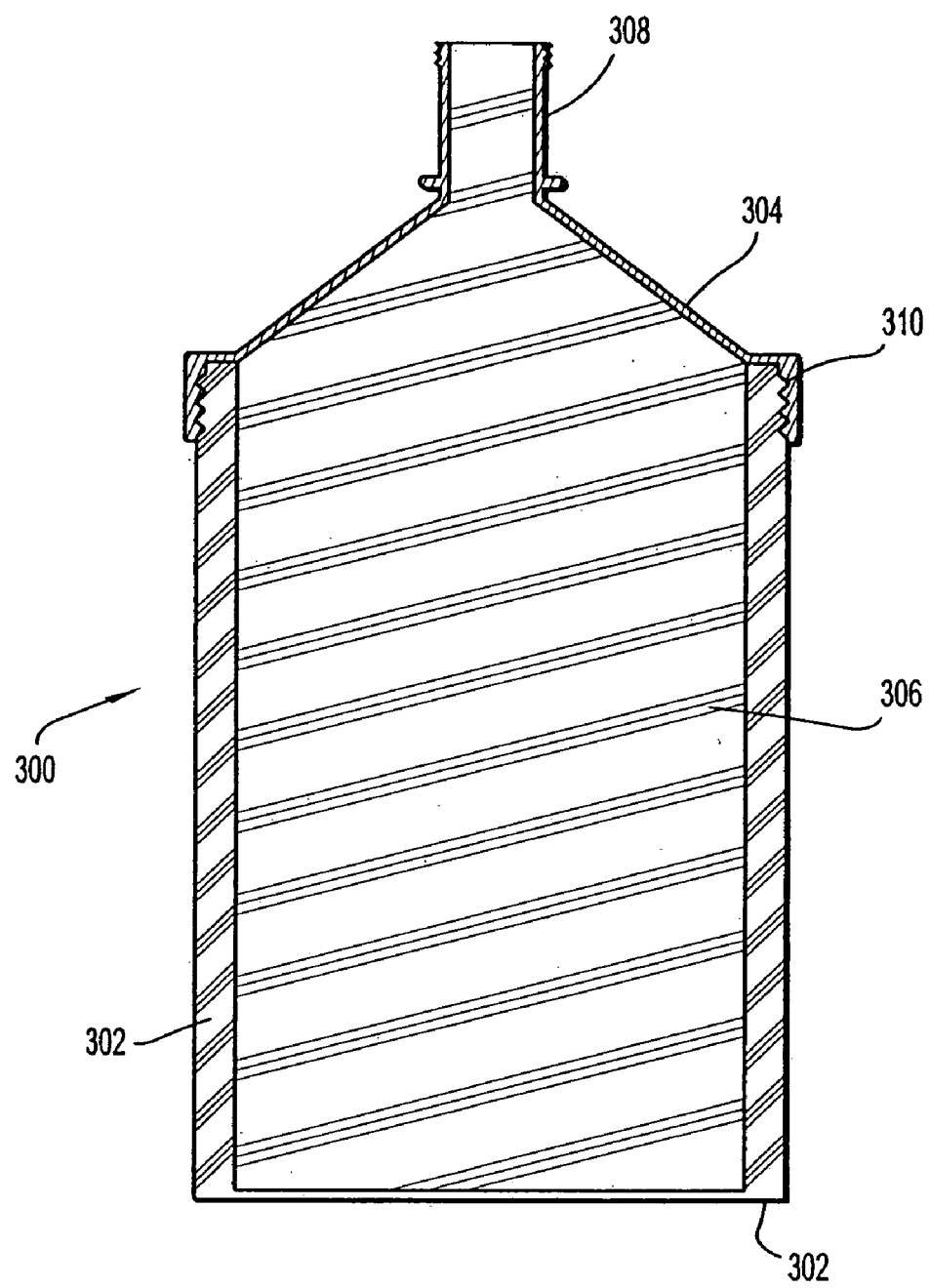
FIG. 10 is a side cross-sectional view of the liquid reclamation apparatus of FIG. 9.
Figure 11:
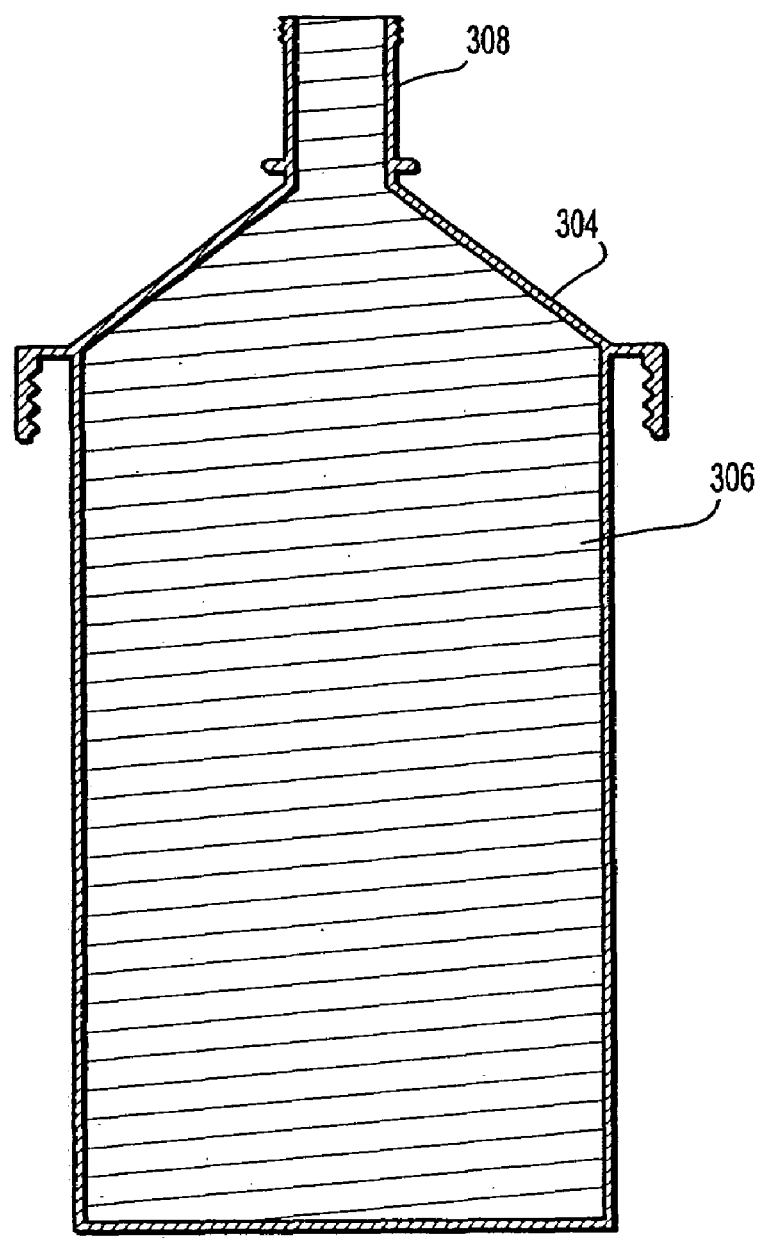
FIG. 11 is a side cross-sectional view of the portable receptacle of the liquid reclamation apparatus of FIG. 9.

Referring now to FIGS. 9-11, another embodiment of the present disclosure will now be discussed. Liquid reclamation apparatus 300 includes container 302 and dispenser cover 304 releasably mounted to the container. Portable flexible receptacle 306 is attached to dispenser cover 304 and is disposed within container 302. Receptacle 306 is dimensioned to hold oil. Dispenser cover 304 defines spout 308 to permit dispensing of the oil contained within receptacle 306. Dispenser cover 304 may be detachably mounted to container 302 via a threaded connection 310. Apparatus 300 further includes cap 312 which is releasably mounted to spout 308 of dispenser cover 304 by conventional means.

In use, apparatus 300 may be purchased full of oil or it may be empty. If full, dispenser cover 304 is unscrewed and the dispenser cover with attached portable receptacle 306 are removed from container 302. The waste oil or fluid may then be drained into container 302. Cap 310 is removed from spout 308 and the oil from the portable receptacle 306 is subsequently emptied into the engine. Once receptacle 306 is emptied, dispenser cover 304 with mounted cap 310 is secured to container 302. Apparatus 300 may then be sent to the proper recycling plant if required.

It will be understood that various modifications and changes in form and detail may be made to the embodiments of the present disclosure without departing from the spirit and scope of the invention. Therefore, the above description should not be construed as limiting the invention but merely as exemplifications of preferred embodiments thereof. Those skilled in the art will envision other modifications within the scope and spirit of the present invention as defined by the claims appended hereto. Having thus described the invention with the details and particularity required by the patent laws, what is claimed and desired protected is set forth in the appended claims.

What is claimed is:

1. An oil reclamation system which comprises: first and second reclamation apparatuses connected to each other in side by side relation, each reclamation apparatus including: a container; a portable receptacle configured to fit within said container and dimensioned to hold a volume of oil sufficient to perform an oil change on a vehicle, and having a dispenser attached thereto; and a cover releasably secured to said container; and said first reclamation apparatus including at least one attachment rail adjacent an outer wall portion of said container and said second reclamation apparatus includes at least one attachment groove adjacent an outer wall portion of said container for receiving said at least one attachment rail to connect said containers of said first and second oil reclamation apparatuses.

2. The oil reclamation system according to claim 1, wherein said portable receptacle includes a flexible bag.

3. The oil reclamation system according to claim 1 including threaded means for releasably securing said cover to said container.

4. The oil reclamation system according to claim 1 wherein said first reclamation apparatus further includes at least one attachment groove adjacent an outer wall portion of said container and said second reclamation apparatus includes at least one attachment rail adjacent an outer wall portion of said container.

5. The oil reclamation system according to claim 1 including first and second reclamation apparatii arranged in vertical stacked relation.

6. The oil reclamation system according to claim 5 wherein said container of said first reclamation apparatii includes a recessed portion adapted to accommodate at least said cover of said second reclamation apparatii when in said vertical stacked relation of said first and second reclamation apparatii.

7. The oil reclamation system according to claim 1 wherein said portable receptacle includes a volume of oil sufficient to perform an oil change on a vehicle.

8. The oil reclamation system according to claim 1 wherein said cover is attached to said portable receptacle whereby removal of said cover from said containers causes corresponding removal of said portable receptacle.

* * * * *